United States Patent
Reed et al.

(10) Patent No.: US 11,752,928 B2
(45) Date of Patent: Sep. 12, 2023

(54) AERODYNAMIC MAGNETICALLY ATTACHED LIGHT FOR A TOWED VEHICLE

(71) Applicant: HOPKINS MANUFACTURING CORPORATION, Emporia, KS (US)

(72) Inventors: Scott Reed, Emporia, KS (US); William Elliott, Emporia, KS (US); Dan Scheller, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 17/934,617

(22) Filed: Sep. 23, 2022

(65) Prior Publication Data
US 2023/0092753 A1    Mar. 23, 2023

Related U.S. Application Data

(60) Provisional application No. 63/247,466, filed on Sep. 23, 2021.

(51) Int. Cl.
*B60Q 1/30* (2006.01)
*F21S 43/50* (2018.01)
*F21V 21/096* (2006.01)
*B60Q 1/26* (2006.01)

(52) U.S. Cl.
CPC ........... *B60Q 1/305* (2013.01); *B60Q 1/2615* (2013.01); *F21S 43/51* (2018.01); *F21V 21/096* (2013.01)

(58) Field of Classification Search
CPC ....... B60Q 1/305; B60Q 1/2615; F21S 43/51; F21V 21/096
USPC .......................................... 362/549, 398, 496
See application file for complete search history.

(56) References Cited

U.S. PATENT DOCUMENTS

| | | | | |
|---|---|---|---|---|
| 2,695,949 | A * | 11/1954 | Ashwill | G01C 9/32 33/DIG. 1 |
| 3,910,540 | A * | 10/1975 | Kayler | F21V 21/096 248/500 |
| 6,100,801 | A * | 8/2000 | Plummer | B60Q 1/305 362/540 |
| 8,545,066 | B2 * | 10/2013 | Coleman | F21V 21/0965 362/249.02 |
| 9,884,584 | B1 * | 2/2018 | Lackemeyer | B60Q 1/2611 |
| 2016/0090034 | A1 * | 3/2016 | Brown | B60Q 1/2615 340/468 |
| 2016/0281942 | A1 * | 9/2016 | Hernandez, IV | H02S 40/38 |

FOREIGN PATENT DOCUMENTS

CN    110217161    * 9/2019

* cited by examiner

*Primary Examiner* — Laura K Tso
(74) *Attorney, Agent, or Firm* — Hovey Williams LLP (57) ABSTRACT

A removable light for a towed vehicle includes a housing with a low profile shape, an anchor, a safety tether strap, and lens protection features.

16 Claims, 11 Drawing Sheets

AERODYNAMIC MAGNETICALLY ATTACHED LIGHT FOR A TOWED VEHICLE

RELATED APPLICATION

This patent application claims priority benefit with regard to all common subject matter of earlier filed U.S. Provisional Patent Application Ser. No. 63/247,466, filed Sep. 23, 2021, and entitled "AERODYNAMIC MAGNETICALLY ATTACHED LIGHT FOR A TOWED VEHICLE," which is hereby incorporated by reference in its entirety into the present application.

BACKGROUND

Trucks, motorhomes, and other towing vehicles often tow trailers, cars, and other towed vehicles. Because a towed vehicle at least partially blocks the brake lights and turn signals on the towing vehicle, the towed vehicle must have brake lights and turn signals that are synchronized with the lights on the towing vehicle. Plug-type adaptors that connect the lighting systems of towing vehicles to the lighting systems of towed vehicles have been created to provide this synchronization. Such adaptors are typically installed on boat trailers and other types of trailers that are frequently towed, but they are typically absent from cars and trucks that aren't frequently towed. Thus, to provide visible turn lights and brake lights on cars and trucks that are infrequently towed, removable lights are often installed on their trunks or roofs. Unfortunately, existing removable lights are large and cumbersome and often become dislodged when subjected to bumps, vehicle vibrations, and/or air drag. This can damage or destroy the lights, scratch the paint on the towed vehicles, and create hazards for vehicles following the towed vehicle.

SUMMARY

The present invention solves the above-described problems and provides a distinct advance in the art of removable lights for towed vehicles. More particularly, the present invention provides a removable light for a towed vehicle that is more aerodynamic and less susceptible to becoming dislodged and damaged.

An embodiment of the removeable light achieves the foregoing objectives by employing a housing with a low profile shape, an anchor and safety tether strap, and a lens protection features. A magnet or magnets are mounted on or in a bottom wall of the housing to magnetically attach the light to a trunk lid or other metal surface on a towed vehicle.

The low-profile housing is shaped and configured to be less susceptible to wind drag to help keep the light securely attached to the towed vehicle. In one embodiment, the side of the housing facing the towed vehicle is shorter than the side facing behind the towed vehicle, the roof of the housing curves generally upwardly from the rear side to the front side, and the width of the housing is greater than the height of the housing. This creates a tapered and low profile shape that causes the housing to be biased downward onto the towed vehicle by air passing over the housing so it is much less susceptible to being dislodged from the vehicle.

The anchor and safety strap further resist dislodging of the light from the towed vehicle. An embodiment of the anchor is a spherical rubber ball that is placed inside the towed vehicle's trunk or hatchback. The safety tether, which is attached between the anchor and housing and in one embodiment is approximately 18" long, extends out of a gap or seam between the trunk lid and the vehicle body. If the towed vehicle travels over a pothole, speed bump, or is otherwise subjected to a shock that could overcome the magnetic force of the magnets in the housing, the anchor and safety tether keep the light from falling off the towed vehicle. Moreover, the above-described low-profile shape and configuration and the forces exerted by the safety tether keep the housing upright with the bottom of the housing facing down toward the towed vehicle even when it is temporarily lifted from the towed vehicle so that it quickly reattaches itself to the towed vehicle via the magnet when the housing drops back onto the towed vehicle.

To prevent damage to lenses of the light, the housing further comprises four corner protrusions. These protrusions from the front side of the housing to protect the lenses if the light is dropped during installation or removal.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

A removeable light 10 constructed in accordance with embodiments of the present invention is depicted in the attached drawing figures. As illustrated in FIGS. 7-11, and as discussed in more detail below, the light 10 may be attached to a trunk lid T or other surface of a towed vehicle V and includes features that make it less susceptible to becoming dislodged from the towed vehicle and features that resist damage if it is dropped during installation and/or removal.

Figure 3:
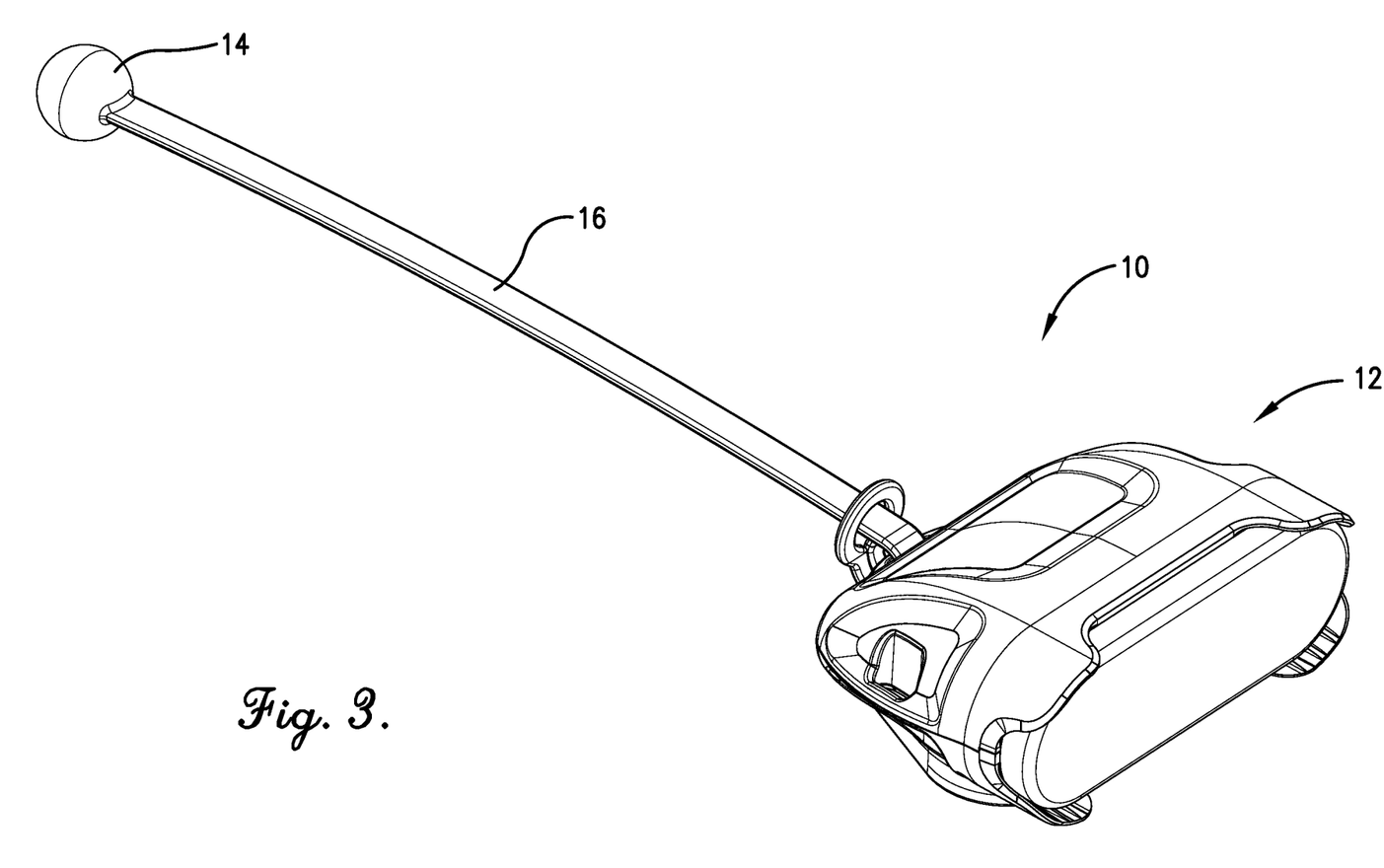
FIG. 3 is a top perspective view of the removable light with its anchor and safety tether strap attached.
Figure 4:
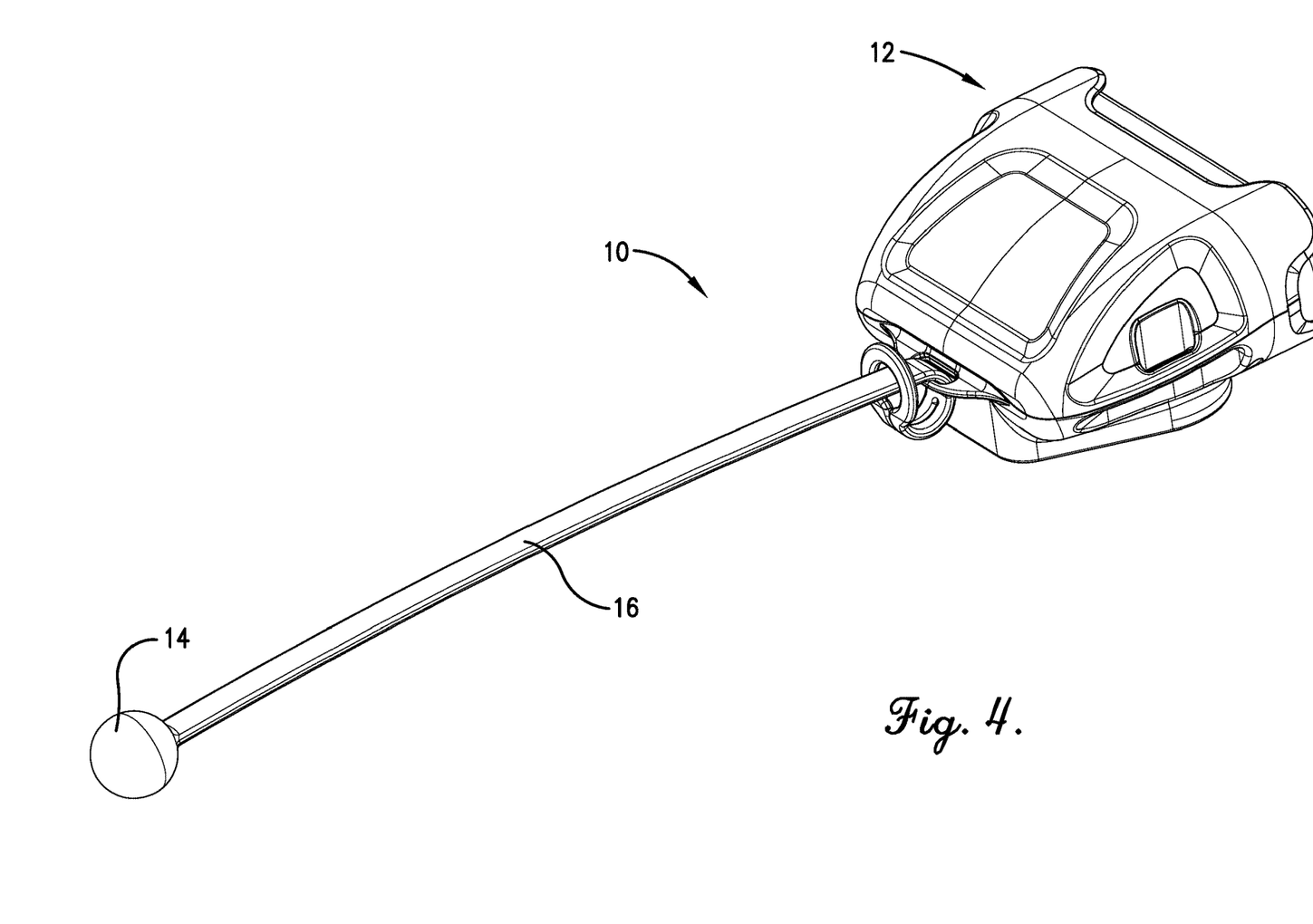
FIG. 4 is another top perspective view of the removable light with its anchor and safety tether strap attached.

Referring to FIG. 3, an embodiment of the removeable light 10 broadly comprises a housing 12; an anchor 14; and a safety tether strap 16, all of which are preferably made of rubber, plastic, or other impact resistant materials.

Figure 1:
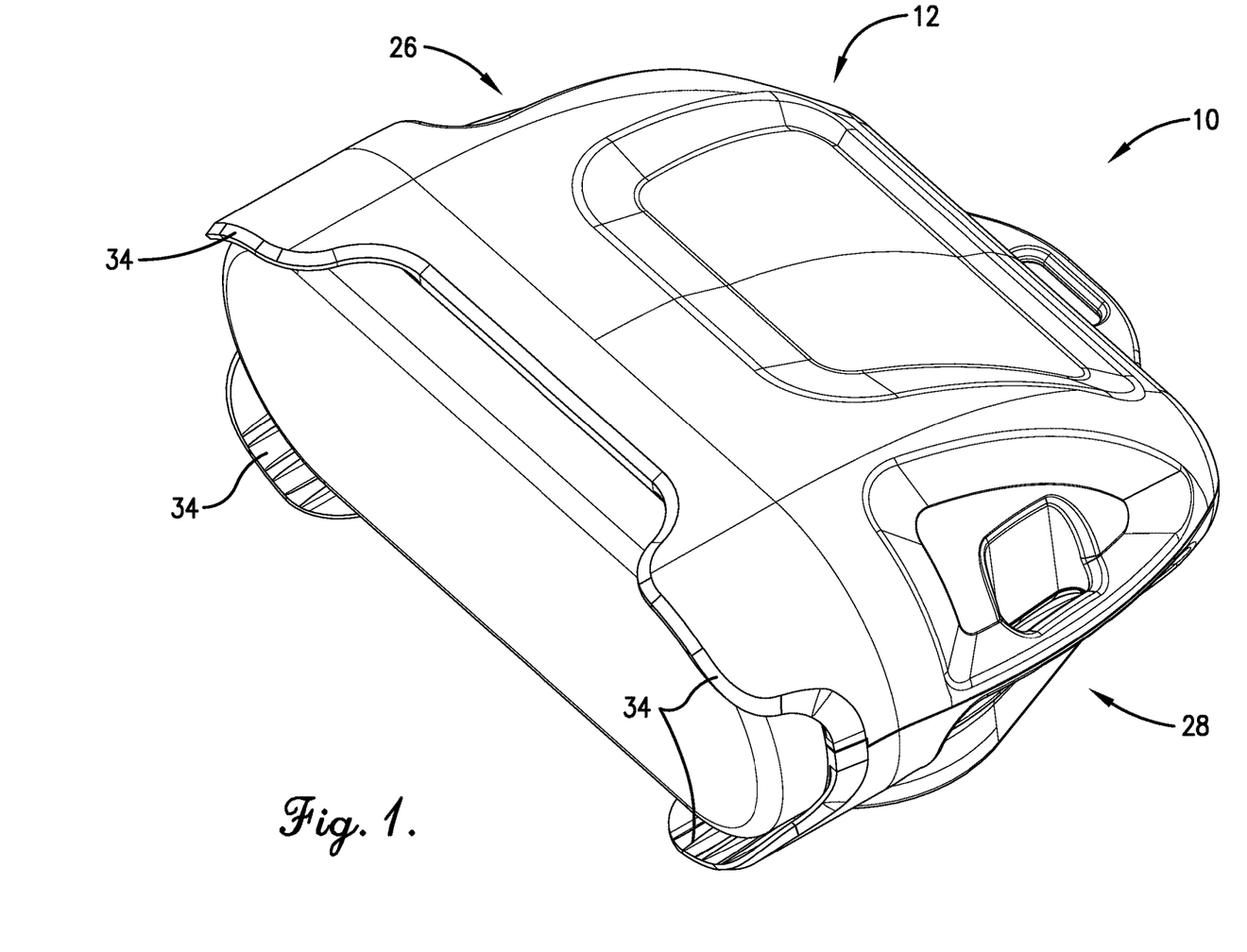
FIG. 1 is a perspective view of a removeable light constructed in accordance with an embodiment of the present invention.
Figure 2:
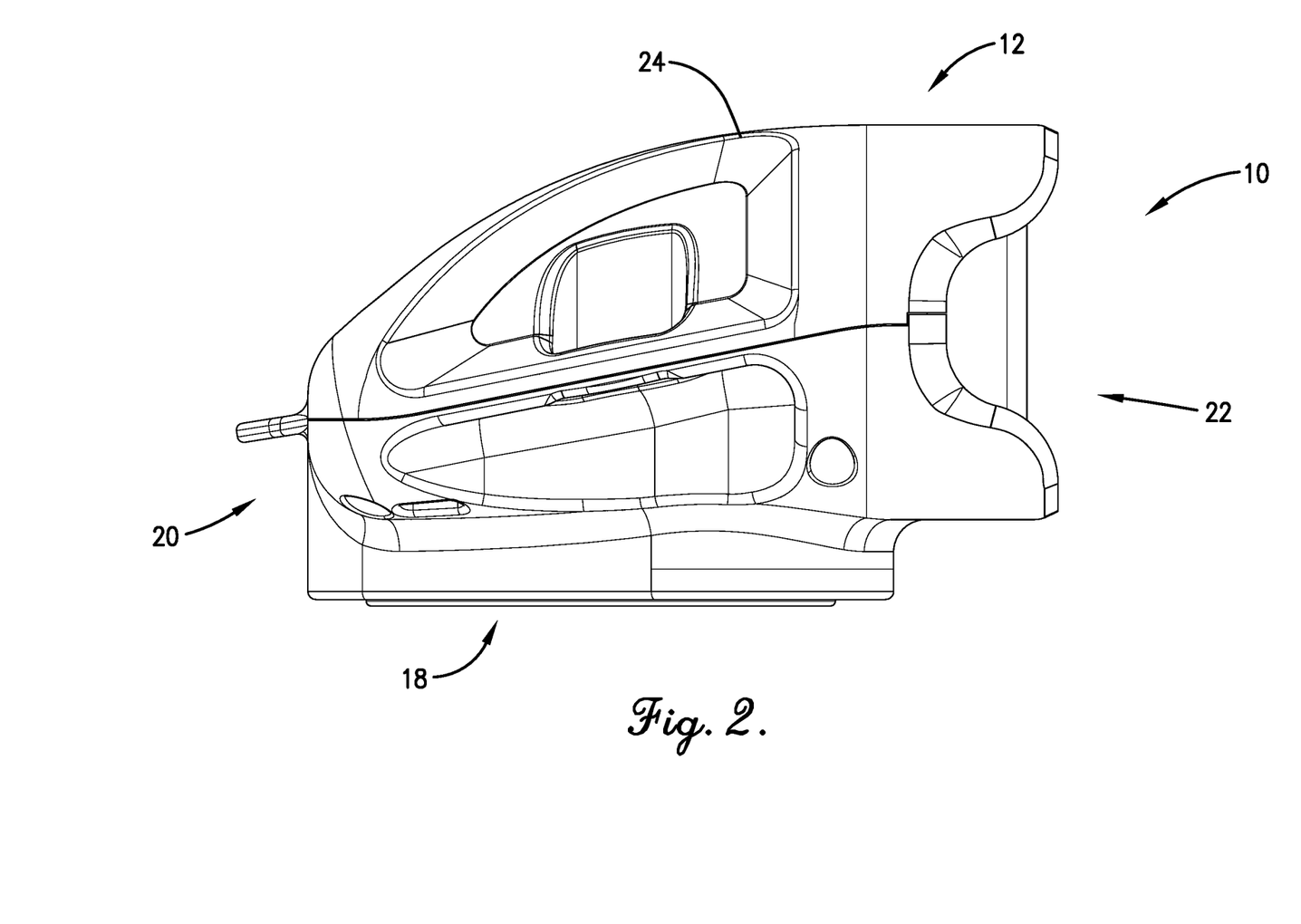
FIG. 2 is a side view of the removable light.
Figure 5:
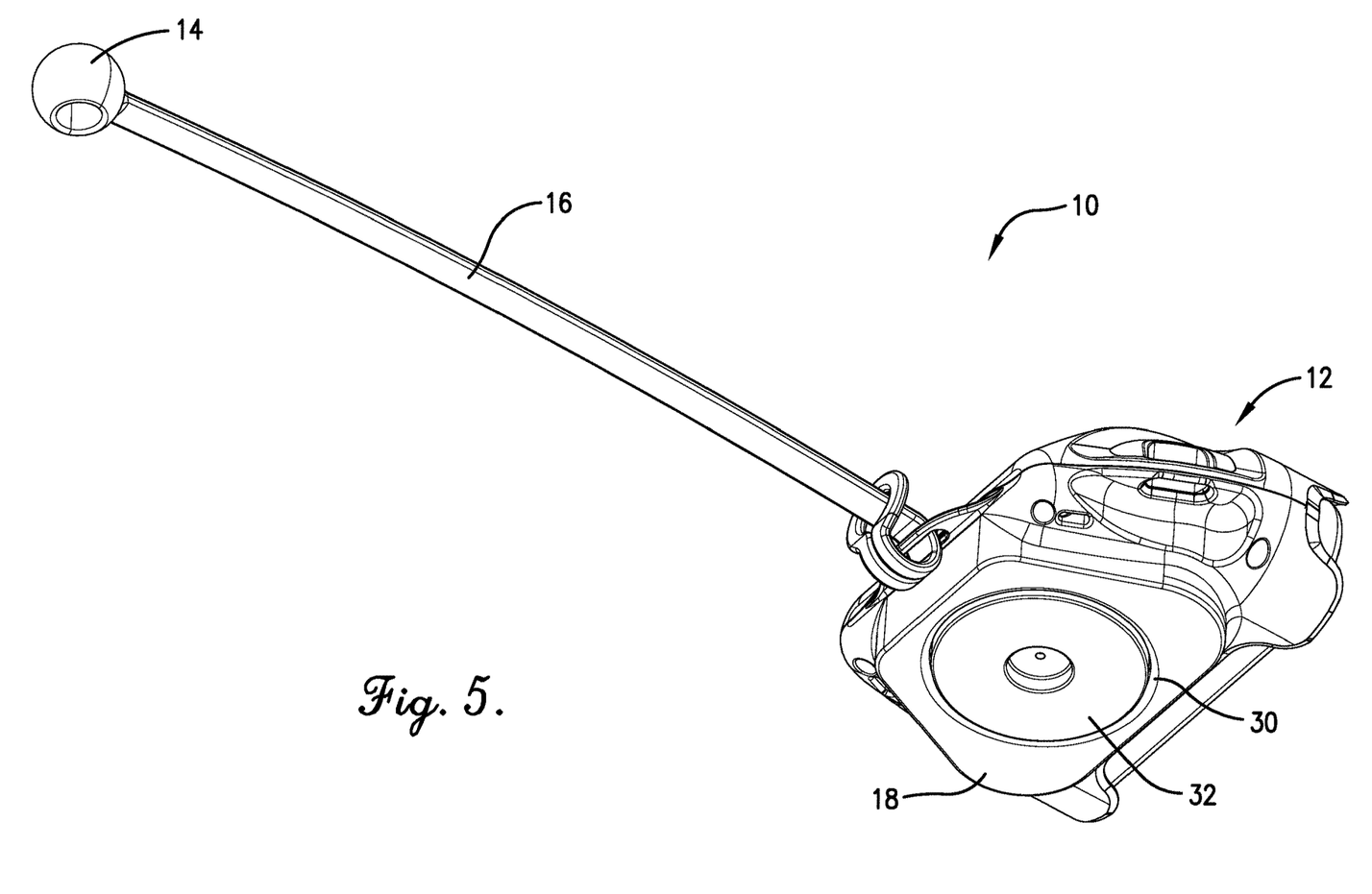
FIG. 5 is a bottom perspective view of the removable light with its anchor and safety tether strap attached.
Figure 6:
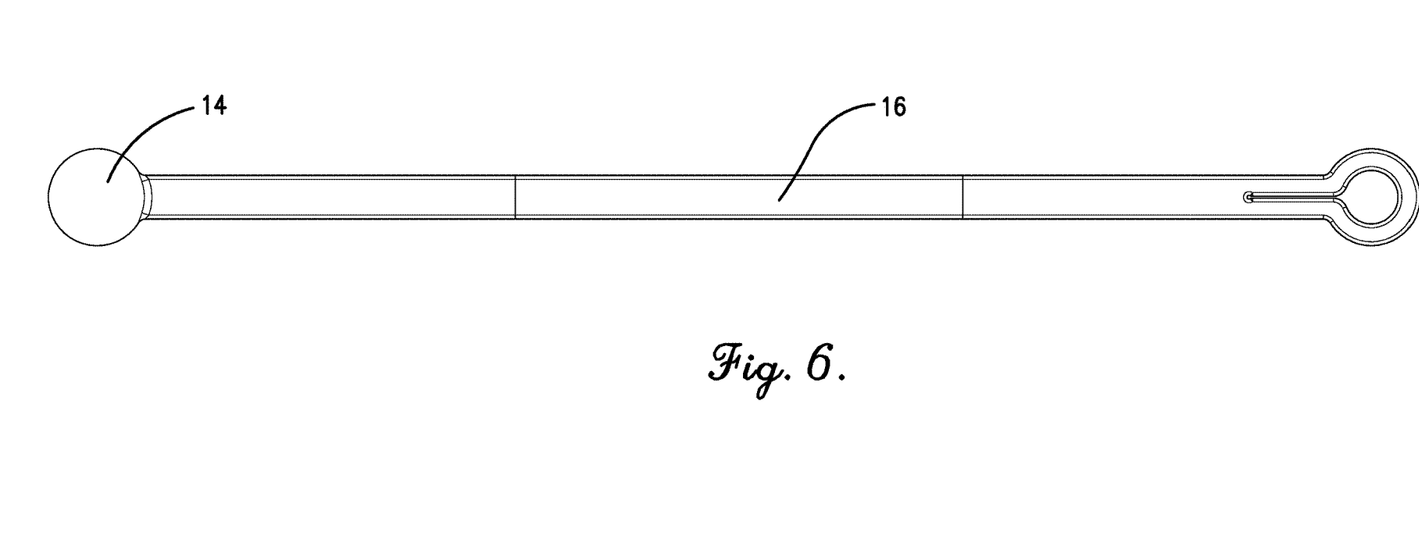
FIG. 6 is a top view of the safety tether strap removed from the housing of the removable light.

The housing 12 has a low profile that is less susceptible to wind drag to help keep the light securely attached to the towed vehicle. As best shown in FIGS. 1, 2, and 5, an embodiment of the housing comprises a bottom wall 18, a rear side 20 facing the towed vehicle, a front side 22 facing behind the towed vehicle, a roof or top wall 24, a left side 26, and a right side 28. Referring to FIG. 5, the bottom wall 18 includes a circular recess 30 for receiving a magnet 32 or magnets that removably secure the housing to the towed vehicle trunk lid or other metal surface.

The housing has a partially hollow interior chamber for enclosing conventional lights, power and control circuitry, and lenses. The power and control circuitry may receive power from dedicated batteries or the towed vehicle's battery and may communicate with a light controller via wired or wireless signals.

As best shown in FIG. 2, the rear side 20 of the housing is shorter than the front side 22, and the roof 24 curves upwardly from the rear side 20 to the front side 22 to create an upwardly tapered profile from the housing back to front. As best shown in FIG. 1, a width of the housing, as measured from the left side 26 to the right side 28, is greater than a height of the housing, as measured from the bottom wall 18 to the roof 24. In one embodiment, the width is at least twice the height. These features create a wide, tapered, low-profile housing shape, with an increasing height from the rear to the front, such that air passing over the housing 12 pushes it downward onto the towed vehicle trunk lid T to maintain magnetic adhesion with the towed vehicle V even with the light 10 is subject to vibrations and shocks transmitted from the road through the vehicle. In some embodiments, the roof 24 has depressions pockets that catch air passing over the housing to provide additional downward adhesion to the towed vehicle.

To prevent damage to lenses and electronics mounted in or on the housing 12, four corner protrusions 34 project outwardly from the front side of the housing. These protrusions 34 protect lenses and internal components of the light and absorb vibrations if the light is dropped during installation or removal.

The anchor 14 and safety tether strap 16 prevent the removeable light 10 from becoming dislodged from the towed vehicle V should the magnet 32 lose contact with the trunk lid T. In some embodiments of the invention, the anchor and safety tether strap are omitted, as the magnet 32 can alone securely hold the housing to the towed vehicle.

As shown in FIGS. 7-11, the anchor 14, which in one embodiment is a spherical rubber ball 1-3 inches in diameter, is placed inside the towed vehicle's trunk or hatchback, with the safety tether strap 16, which in one embodiment is approximately 18" long, extending out of a gap or seam formed between the trunk or hatchback door/lid and the vehicle body. If the towed vehicle is pulled over a pothole, speed bump, or is otherwise subjected to a shock that could overcome the magnetic force of the magnets in the housing, the anchor 14 and safety tether 16 keep the light 10 from falling off the towed vehicle. Moreover, the above-described low-profile shape and configuration and the forces exerted by the safety tether keep the housing upright with the bottom wall 18 facing down toward the towed vehicle even when it is temporarily lifted from the towed vehicle so that it quickly reattaches itself to the towed vehicle via the magnet 32 when the housing 12 drops back onto the towed vehicle.

Figure 7:
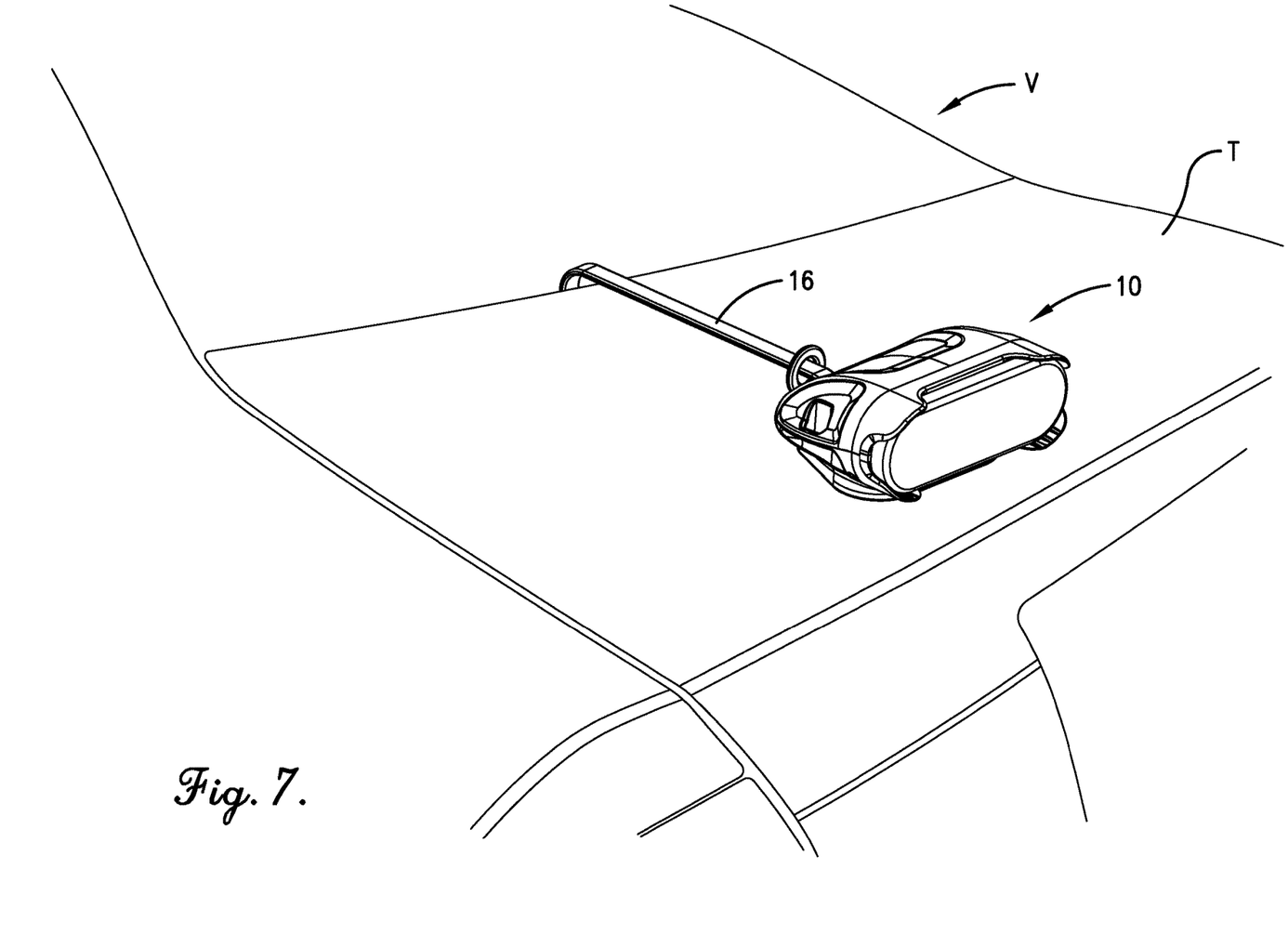
FIG. 7 is a perspective view of the removeable light shown attached to a trunk lid of a vehicle.
Figure 8:
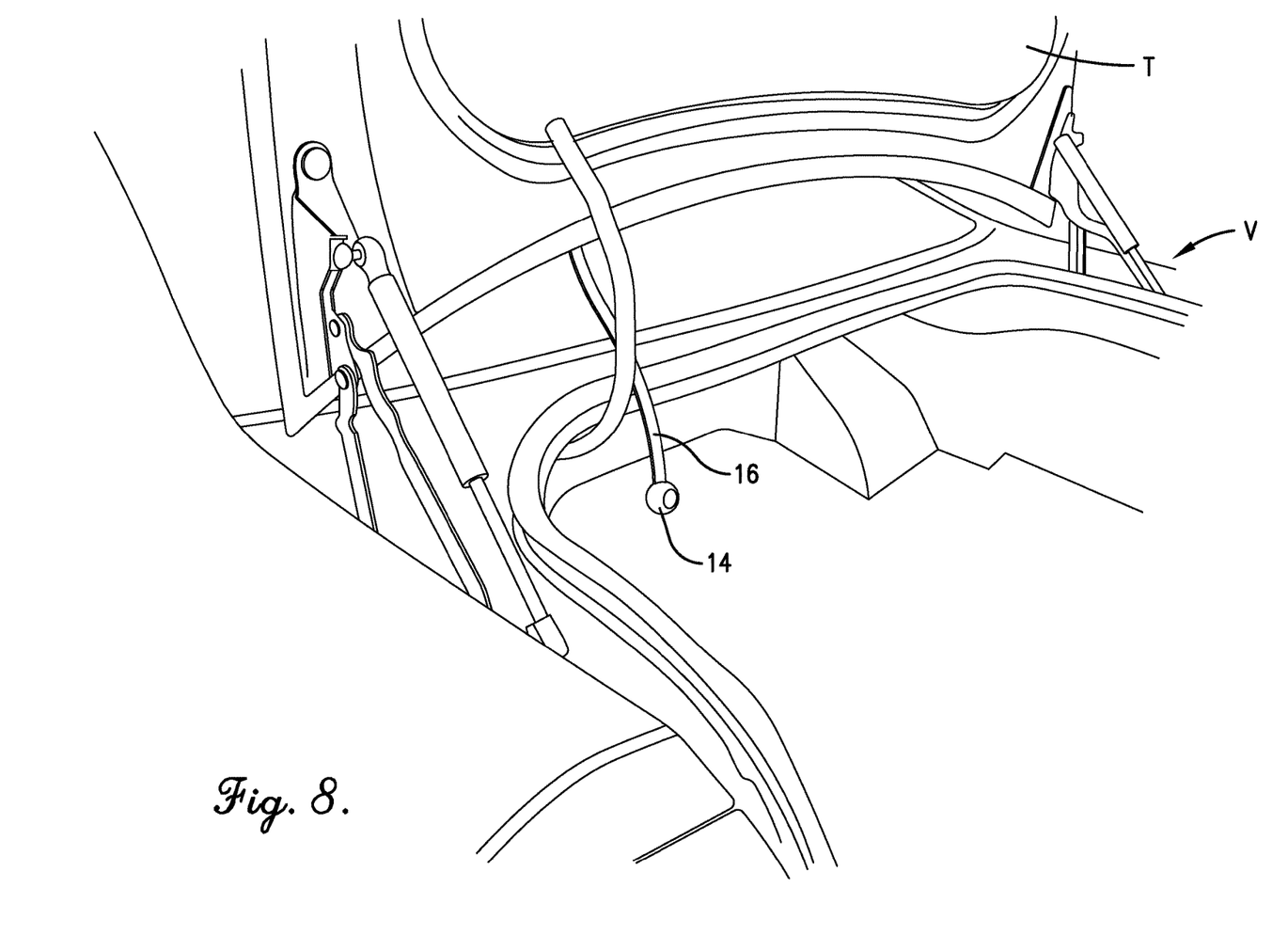
FIG. 8 is a perspective view of the vehicle trunk lid shown opened to either attach or remove the removable light.
Figure 9:
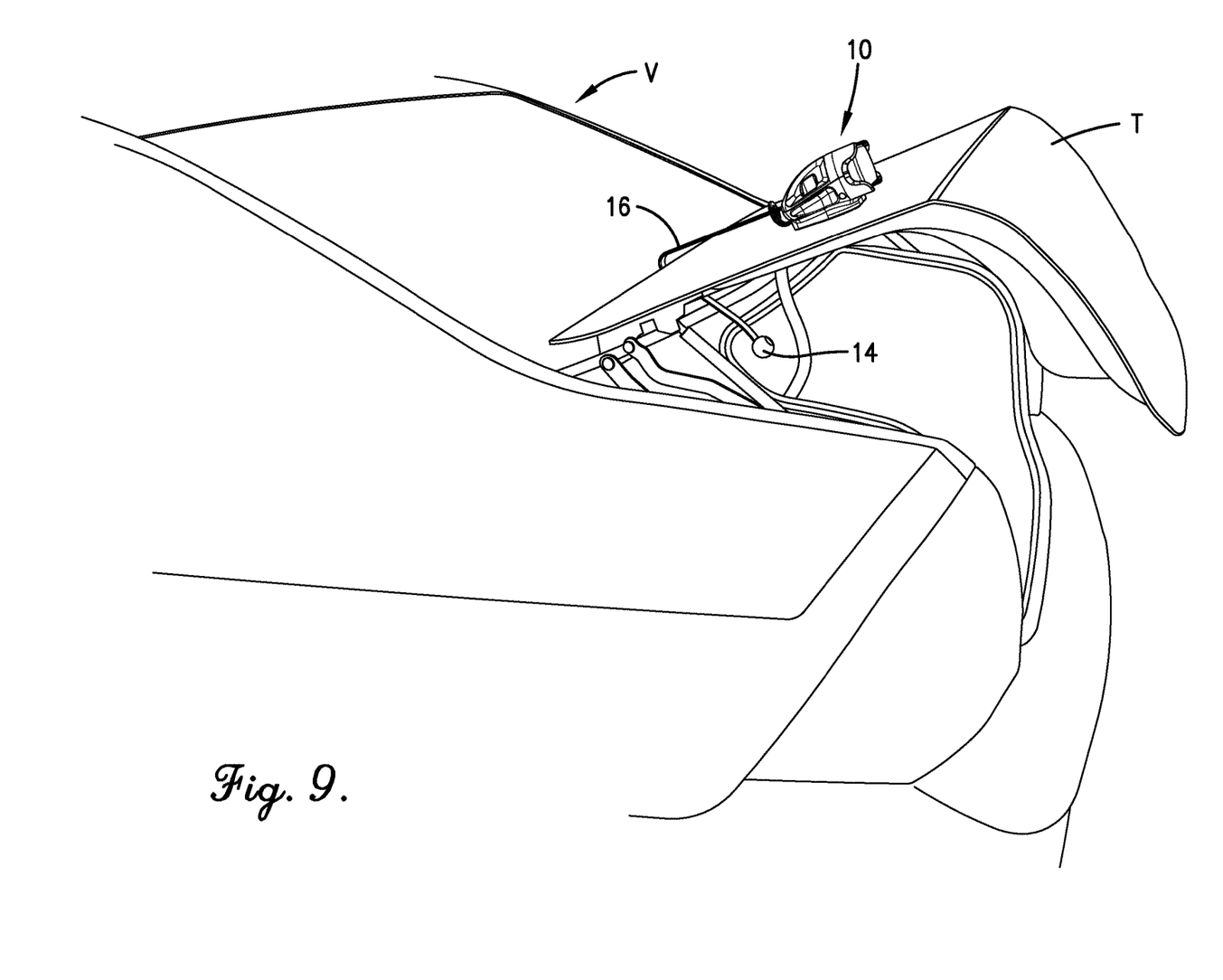
FIG. 9 is a perspective view of the vehicle trunk lid shown partially closed with the removable light positioned atop the trunk lid.
Figure 10:
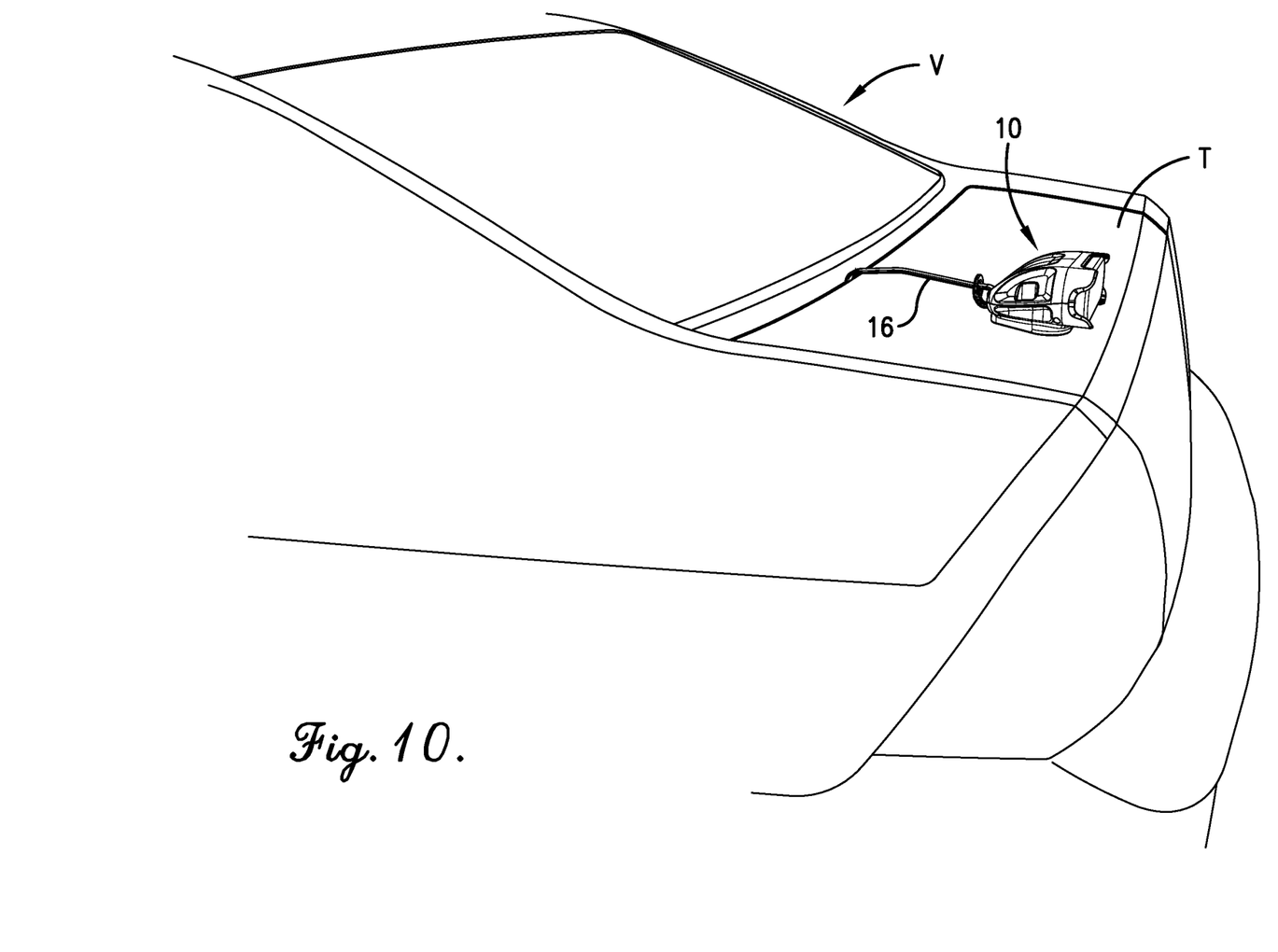
FIG. 10 is a perspective view of the vehicle trunk lid shown closed with the removable light positioned atop the trunk lid and with the safety tether strap in a partially slack state.
Figure 11:
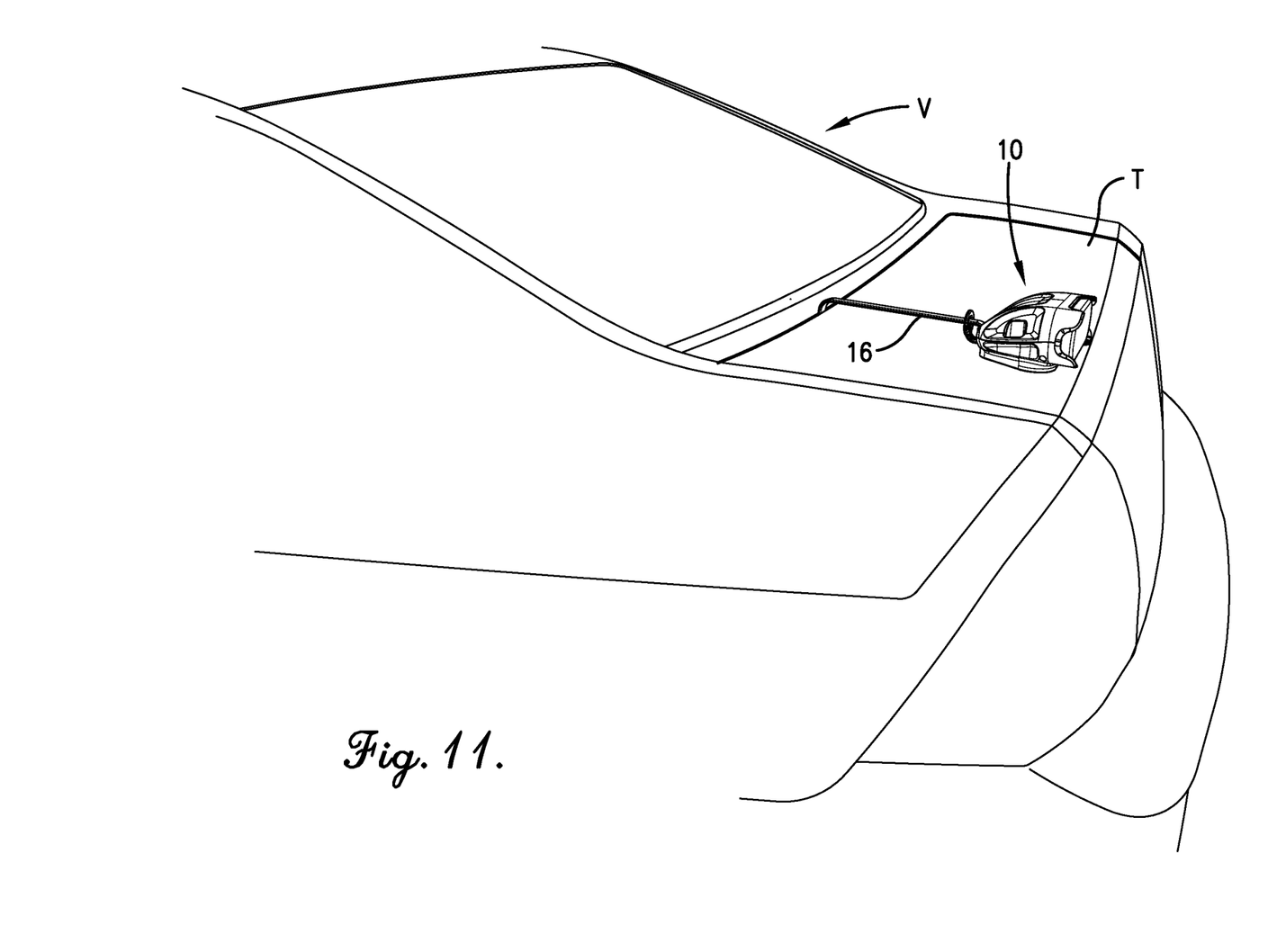
FIG. 11 is a perspective view of the vehicle trunk lid shown closed with the removable light positioned atop the trunk lid and with the safety tether strap pulled taught to remove all slack.

In use, two of the above described removable lights 10 may be attached to the trunk lid T or other metal surface of the towed vehicle T to serve as left and right turn signals and brake lights. One exemplary attachment procedure is depicted in FIGS. 7-11. As best shown in FIGS. 7-9, one of the lights 10 is placed on the trunk lid so that its magnet couples with the trunk lid. The trunk lid is then opened, and the anchor 14 is inserted in the gap between the trunk lid and the trunk and allowed to hang in the trunk as shown in FIG. 8. The trunk lid is then closed with the anchor 14 remaining inside the trunk as shown in FIG. 10. The light 10 is then moved to the back edge of the trunk lid until the anchor 14 contacts the underside of the trunk lid so that all slack is removed from the safety tether as shown in FIG. 11. These steps may then be repeated for another light.

The removable lights 10 may be wired directly to an adaptor on the towing vehicle or may have wireless receivers for receiving turn and brake signals from a wireless transmitter/transponder connected to an adaptor on the towing vehicle. The lights are thus operated in the same manner as the turn signals and brake lights on the towing vehicle. When the towed vehicle is disconnected from the towing vehicle, the lights may be detached and stored for later use.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A removable light for attachment to a towed vehicle, the removable light comprising:
    a housing comprising a front light emission side and a rear side opposite the light emission side, a bottom side configured to be positioned near the towed vehicle, a top side opposite the bottom side, and opposing left and right sides extending from the front light emission side to the rear side, the rear side being shorter than the front light emission side, the housing having a width between the left side and the right side and a height between the top side and the bottom side, the width being greater than the height;
    an anchor that may be secured to the towed vehicle and spaced from the housing; and
    a safety tether attached and extending between the housing and the anchor.

2. The removable light of claim 1, further comprising corner protrusions surrounding and extending from the front light emission side of the housing.

3. The removable light of claim 1, wherein the width of the housing is approximately twice the height of the housing.

4. The removable light of claim 1, wherein the anchor is a spherical ball.

5. The removable light of claim 1, wherein the safety tether is approximately 18" long.

6. The removable light of claim 1, wherein the housing tapers upwardly from the rear side to the front light emission side.

7. The removable light of claim 1, wherein the housing has a bottom wall on the bottom side with a circular recess and wherein the light further comprises a magnet positioned in the recess for magnetically coupling the housing to a trunk lid of the towed vehicle.

8. A removable light for attachment to a towed vehicle, the removable light comprising:
    a housing comprising a front light emission side, a rear side opposite the light emission side, a bottom side configured to be positioned near the towed vehicle, a top side opposite the bottom side, and opposing left and right sides extending from the front light emission side to the rear side, the rear side being shorter than the front light emission side, the housing having a width between the left side and the right side and a height between the top side and the bottom side, the width being approximately twice the height;
    an anchor that may be secured within a trunk of the towed vehicle and spaced from the housing;
    a safety tether attached and extending between the housing and the anchor; and
    corner protrusions surrounding and extending from the front light emission side of the housing.

9. The removable light of claim 8, wherein the anchor is a spherical ball.

10. The removable light of claim 8, wherein the safety tether is approximately 18" long.

11. The removable light of claim 8, wherein the housing tapers upwardly from the rear side to the front light emission side.

12. The removable light of claim 8, wherein the bottom side has a circular recess and wherein the light further comprises a magnet positioned in the recess for magnetically coupling the housing to a trunk lid of the towed vehicle.

13. A removable light for attachment to a towed vehicle, the removable light comprising:
    a housing comprising a front light emission side, a rear side opposite the front light emission side, a bottom side configured to be positioned near the towed vehicle, a top side opposite the bottom side, and opposing left and right sides extending from the front light emission side to the rear side; wherein the bottom side has a circular recess;
    an anchor that may be secured within a trunk of the towed vehicle and spaced from the housing;
    a safety tether attached and extending between the housing and the anchor; and
    a magnet positioned in the recess for magnetically coupling the housing to a trunk lid of the towed vehicle.

14. The removable light of claim 13, wherein the housing tapers upwardly from the rear side to the front light emission side.

15. The removable light of claim 13, wherein the safety tether is approximately 18" long.

16. The removable light of claim 13, further comprising corner protrusions surrounding and extending from the front light emission side of the housing.

* * * * *